UNITED STATES PATENT OFFICE.

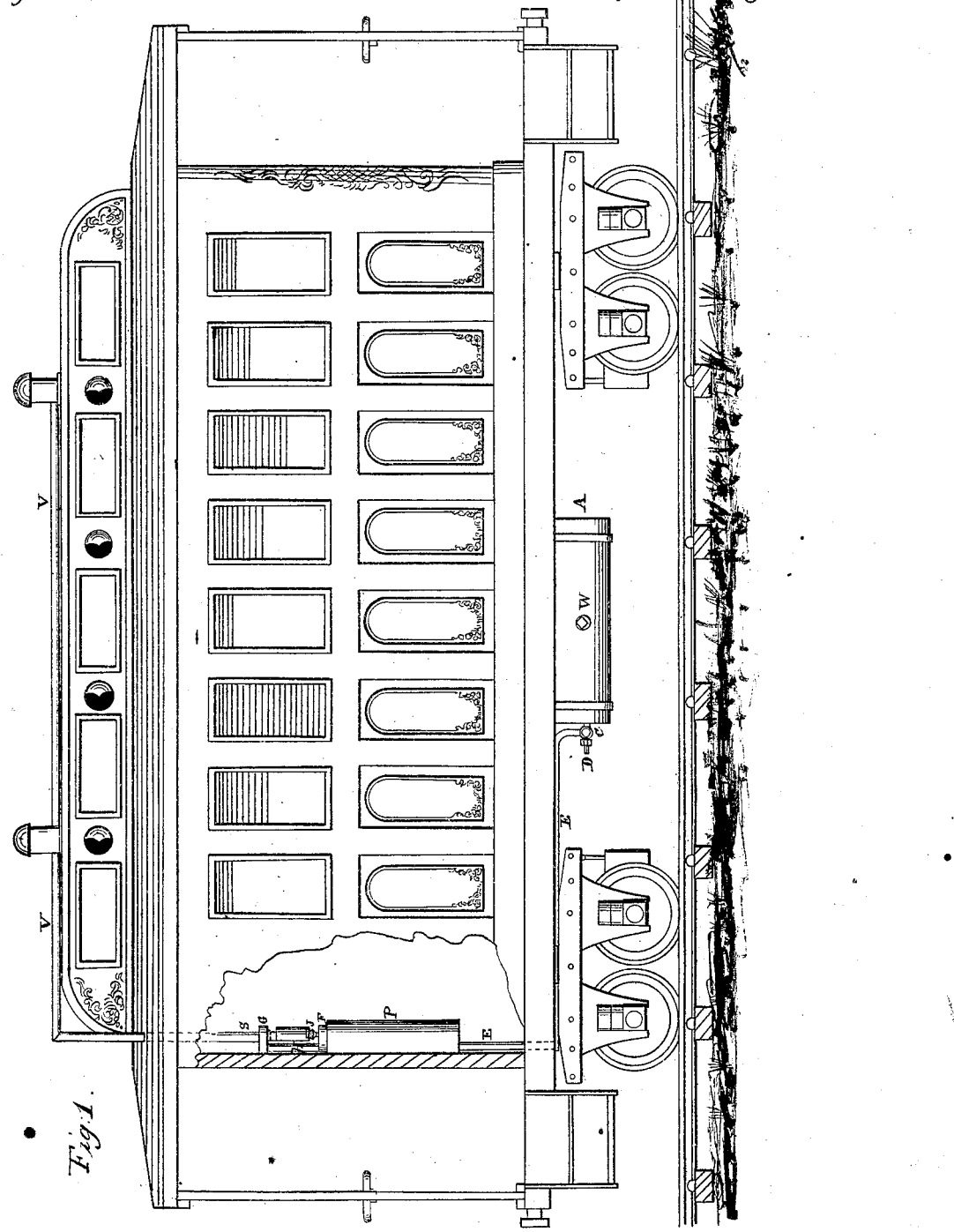

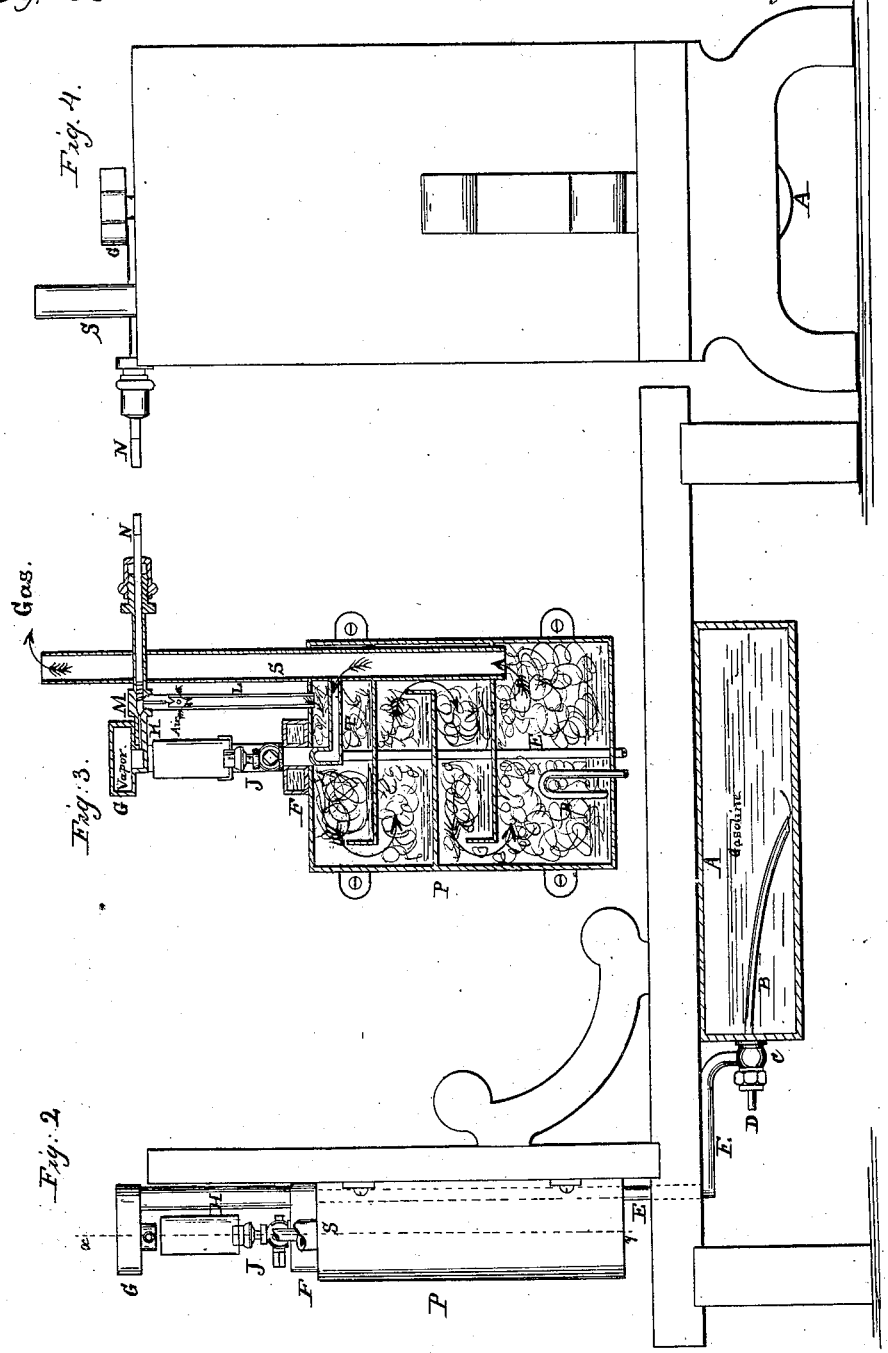

HIRAM S. MAXIM AND JAMES RADLEY, OF NEW YORK, N. Y.

IMPROVED APPARATUS FOR MAKING ILLUMINATING-GAS FROM GASOLINE.

Specification forming part of Letters Patent No. 89,588, dated May 4, 1869.

*To all whom it may concern:*

Be it known that we, HIRAM S. MAXIM and JAMES RADLEY, both of the city and county of New York, and State of New York, have invented certain new and useful Improvements in Apparatus for Making Illuminating-Gas from Gasoline or other hydrocarbon-fluids in combination with atmospheric air, whereby such illuminating-gas can be conveniently and safely made and used in railroad-cars and steam-vessels, and in situations generally where the machines heretofore used for making such gas could not be conveniently employed on account of their comparatively greater bulk, or on account of the liability to accident from the immediate proximity of the heating-flame to the tank containing the gas-fluid; and we do hereby declare that the following is a full, clear, and exact description of the construction and operation of the same, reference being had to the annexed drawings, making a part of this specification, in which—

Figure 1 is a side elevation of a railroad-car with our gas arrangement attached thereto. Fig. 2 is a side elevation of the mixing-chamber, showing, also, the fluid holder or tank in section; Fig. 3, a vertical section of the mixing-chamber through the line $x$ $y$ in Fig. 2; Fig. 4, a rear elevation of the holding-frame for the apparatus, which is shown in side elevation in Fig. 2.

The same parts are indicated in all the figures by the same letters of reference.

The nature of our invention consists, first, in forcing the gas-fluid through the heating and vaporizing chambers by the action of compressed air in the fluid holder or tank; secondly, in heating and vaporizing the gasoline or gas-fluid in a small continuous stream as it passes from the tank to the mixing-chamber; thirdly, in drawing the atmospheric air into the apparatus by the force and velocity of the vaporized fluid as it issues, under the pressure of the air in the fluid-holder, into the air-tube connecting with the mixing-chamber and service-pipes, thereby producing a continuous flow of thoroughly-commingled air and carbon-vapor, or gas of great illuminating power and brilliancy.

To enable others skilled in the art to make and use our invention, we shall proceed to describe its construction and operation.

In Figs. 1 and 2, A is a cylindrical vessel or tank for containing the gas-fluid, and should be sufficiently strong to resist an internal pressure of fifty pounds to the square inch. The exterior of this vessel or tank is shown in Fig. 1; while Fig. 2 shows it in section. When ready for use the tank should be about half-full of the gas-fluid. Air is then forced in until a pressure of about twenty-five pounds to the square inch is obtained; but if the tank is more than half filled with the fluid the pressure of the air should be proportionably increased.

The object of having pressure upon the gas-fluid within the tank by means of air or other elastic medium is to force the gas-fluid from the tank to the heating and vaporizing chambers, and is thus accomplished: In the tank A we place the tube B, reaching nearly to the bottom, or so as to draw off the whole, or nearly the whole, of the fluid. This tube connects with and is controlled by the screw-valve in the chamber C, the stem D of which is made tight by packing. From the valve-chamber C a tube, E, passes to the heating-chamber F, which heating-chamber connects with the vaporizing-chamber G by means of one or more tubes, H.

Upon or in the heating-chamber F we place or construct the heating-lamp J, usually a gas-burner, and supplied with gas from the machine itself. We inclose the flame of this lamp or burner with a chimney, as shown in Figs. 1 and 2, to direct the heat against the under side of the vaporizing-chamber G. The heating and vaporizing chambers being united by one or more tubes, H, the whole of this part of the apparatus becomes heated by conduction, the greatest heat being in the upper or vaporizing chamber G. From the under side of the vaporizing-chamber G a small tube, K, connects with the air-tube L by means of the valve-chamber M, which is fitted with a screw-valve to close or control the tube K, the stem or shank N of which valve is made tight by packing, as shown. The opening from the valve-chamber M into the air-tube L is made into a contracted vent, of small size, and immediately below this vent there are a few small holes in the tube L, for the admission of the atmospheric air in the manner to be presently described. The air-tube L connects with the top of the mixing-chamber P, which mixing-chamber is divided by horizontal partitions into three or four compartments, but made to communicate freely with each other by openings at the alternate ends of the partitions, such openings having a raised border, so as to retain a portion of the condensed gasoline upon the floors of the several compartments, the excess, if any, being allowed to escape from the lower compartment by means of the bent tube R, or in any other convenient manner. From the lower compartment of the mixing-chamber P the main gas-pipe S passes up, either through the mixing-chamber or by the side of it, to supply the service-pipes V, connecting with the various burners.

The main gas-pipe S has also a small branch, T, connecting with the burner or heating-lamp J, the supply of gas to this burner being controlled by a tap or stop-cock in the usual manner.

The several compartments of the mixing-chamber P are filled with the shavings of birch-wood or other suitable fibrous material.

The apparatus being constructed as described, and the tank A supplied with gasoline or gas-fluid to the proper height, and air forced into the necessary pressure, the valve C at the tank A is opened, and thereupon the gas-fluid is forced, by the pressure of the air within the tank, through the tube E into the heating-chamber F, and from thence, by the tube or tubes H, to the vaporizing-chamber G, its further progress being checked by the valve M. A temporary flame is now applied to the under side of the chamber G, which will quickly vaporize a small portion of the gas-fluid within the chamber. The valve M is then opened, when the vapor of the gas-fluid will rush with great velocity through the contracted vent into the air-tube L, thereby producing a vacuous action within the air-tube around the said vent, thus causing the atmospheric air to be drawn into the air-tube through small holes made in it immediately below the contracted vent for that purpose.

The air thus drawn into the apparatus becomes saturated with the gas-vapor, and forms therewith a carbureted gaseous compound, which passes down through the tube L into the upper compartment of the mixing-chamber; then, after permeating through the fibrous stuffing of the several compartments, it passes up the main gas-pipe S, from the lower compartment, to the service-pipes V, in a thoroughly-commingled condition, and fit for use as an illuminating-gas without further treatment; and the burner J being lighted the whole operation becomes automatic, and will, without further attention or assistance, continue to furnish illuminating-gas from the main pipe S until the gas-fluid is exhausted from the tank A, or so long as the tank is supplied with the gas-fluid.

When the supply of vapor from the gas-fluid is too great for the quantity of atmospheric air drawn into the apparatus by the force and velocity of the vapor as it issues from the contracted vent, the surplus will condense and lodge on the several floors of the mixing-chamber, to be again vaporized or taken up when the atmospheric air is in excess in the mixture.

In applying this apparatus to a railroad-car, the tank for holding the gas-fluid can be conveniently placed beneath the middle of the car-body, as shown at A, Fig. 1.

The gas-fluid and air are supplied or forced into the tank A through the aperture W, which should have a valve opening inward and closing outward, so as to admit and retain the fluid and air on disconnecting the supply-pipe from the nozzle of such aperture, or be so constructed as to answer these purposes.

The mixing-chamber P, with the heating and vaporizing chambers F and G, may be placed at one end of the car, or against the partition of the closet usually constructed in such cars, or at any other convenient location, the service-pipe V leading therefrom to the burners, for lighting the interior of the car; and if the heating and vaporizing chambers F and G are placed against the closet-partition, or within the closet, the heating lamp or burner J may be used for lighting such closet.

An apparatus constructed by us as herein described was found to operate well. Nevertheless, we do not limit or confine ourselves to the exact details of construction herein specified, but claim the right, under this patent, to vary the same in any or all its parts, as the circumstances under which it is to be used may suggest, or for any other reason, so long as the principle of the device is retained.

Having thus described our improved apparatus for making illuminating-gas by vaporizing gasoline or other hydrocarbon fluids, and incorporating such vapor with atmospheric air for the purpose of making an illuminating-gas by such mixture, what we claim therein as our own invention, and desire to secure by Letters Patent of the United States, is—

1. The apparatus for making illuminating-gas from gasoline or other hydrocarbon fluids and atmospheric air, in which the gas-fluid is forced from the tank or chamber in which it is held to the heating and vaporizing chambers by the action of the compressed air, or its equivalent, in such tank or chamber, substantially as described.

2. Heating and vaporizing the gas-fluid in a small continuous stream, of sufficient volume only for the required light or lights, by forcing the fluid through the heating and vaporizing chambers by the action of compressed air, or its equivalent, upon such fluid, substantially as described.

3. Drawing atmospheric air into the apparatus, for the purpose of carbureting the same, so as to produce an illuminating-gas by forcing the hydrocarbon vapor through a contracted vent into the perforated air-tube by the action of the compressed air, or its equivalent, upon such vapor, substantially as described.

4. The combination of the fluid and air chamber A, pipe B, and the heating and vaporizing chambers F and G, constructed and operating in the manner and for the purpose substantially as described.

HIRAM S. MAXIM.
JAS. RADLEY.

Witnesses:
A. McALISTER,
R. S. AIKMAN.